United States Patent [19]
Holst et al.

[11] 3,802,861
[45] *Apr. 9, 1974

[54] PRODUCTION OF CALCINED PHOSPHATE FERTILIZERS

[75] Inventors: Rudolf Holst, Hannover-Waldheim; Ulrich Hauschild, Hannover, both of Germany

[73] Assignee: Kali-Chemie AG, Hannover, Germany

[*] Notice: The portion of the term of this patent subsequent to Jan. 30, 1990, has been disclaimed.

[22] Filed: Mar. 11, 1971

[21] Appl. No.: 123,400

Related U.S. Application Data
[63] Continuation of Ser. No. 632,407, April 4, 1967, abandoned.

[30] Foreign Application Priority Data
Apr. 21, 1966 Germany................................. 59051
Sept. 13, 1966 Germany................................. 60235
Nov. 16, 1966 Germany................................. 60721
Nov. 13, 1966 Germany................................. 60722

[52] U.S. Cl........................................ 71/45, 71/47
[51] Int. Cl............................................. C05b 13/00
[58] Field of Search................ 71/42, 45, 46, 34, 47

[56] References Cited
UNITED STATES PATENTS
| | | | |
|---|---|---|---|
| 1,823,849 | 9/1931 | Rothe et al. | 71/45 |
| 3,713,803 | 1/1973 | Holst et al. | 71/47 X |
| 3,533,829 | 10/1970 | Quanquin | 71/34 X |

FOREIGN PATENTS OR APPLICATIONS
| | | | |
|---|---|---|---|
| 467,075 | 6/1937 | Great Britain | 71/46 |

*Primary Examiner*—Samih N. Zaharna
*Assistant Examiner*—Richard Barnes
*Attorney, Agent, or Firm*—Fisher, Christen & Sabol

[57] ABSTRACT

A mixture of phosphate rock, alkali metal carbonate, and silica is calcined in a rotary kiln, and said mixture is prepared by carbonating and concentrating an alkali metal hydroxide solution before or after its admixture to the phosphate rock, by means of the hot calcination waste gases.

19 Claims, 1 Drawing Figure

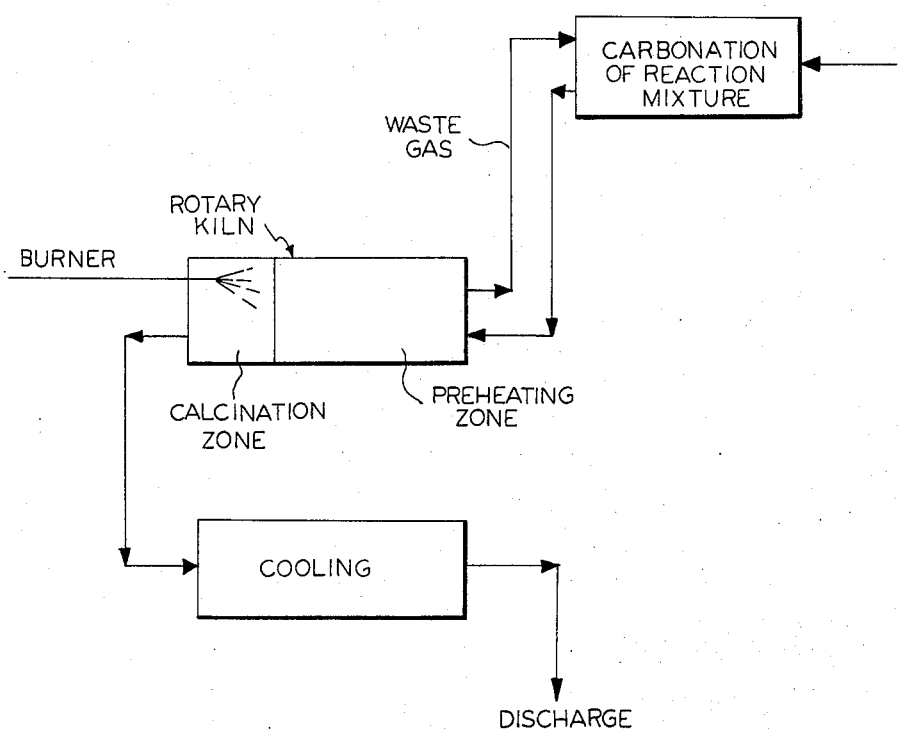

PRODUCTION OF CALCINED PHOSPHATE FERTILIZERS

This application is a continuation of Ser. No. 632,407 filed on Apr. 4, 1967 and now abandoned.

This invention relates to the production of phosphate fertilizers by calcination of natural calcium phosphates.

It is known that such natural calcium phosphates which consist essentially of fluoroapatite, can be converted by a calcination process to efficient phosphate fertilizers. For the decomposition, soda ash, and silica in amounts depending on the gangue present, have been used, see, e.g. U.S. Pat. No. 1,799,882. The calcining temperatures at which the reaction mixtures are strongly sintered, are usually between 110° C and 1,300° C. In the calcination process, the calcium phosphates, also called raw phosphates, are converted to a calcium-sodium-silicophosphate. In these products, the phosphoric acid component is available in a form which is readily sasimilated by plants.

Phosphate fertilizers are evaluated on the basis of the $P_2O_5$ solubility in a 2 percent citric acid solution, or in ammoniacal ammonium citrate solution, which latter is also known as Petermann solution. The final products contain between 27 and 30 per cent by weight of $P_2O_5$. For the production of mixed potassium containing fertilizers, potassium salts like potassium chloride are usually admixed to the calcined phosphates.

It has been also proposed to use potassium carbonate instead of sodium carbonate for the calcination. So far, however, no commercial process for the production of a potassium-calcium-silicophosphate could be developed. This is due not only to economic reasons but also to technical and chemical difficulties. For instance, a process disclosed in French Pat. No. 1,189,773 where the calcium phosphate is decomposed by potassium carbonate at the relatively low temperatures of 550° to 900° C, requires very long reaction times and has the further drawback of using large amounts of alkali. Such excess of alkali causes difficulties in the use of the product.

In addition to alkali metal carbonates, also the use of alkali metal hydroxides has been proposed. However, no commercial phosphate rock decomposition process with alkali metal hydroxides has become known. Our own investigations have shown that very great difficulties are experienced when attempts are made to decompose phosphate rock with alkali metal hydroxides in a calcining kiln. Some of these difficulties are due to the volatility of the alkali metal hydroxides particularly potassium hydroxide, at elevated temperatures, and their high alkalinity. There are considerable losses of alkali and strong corrosion of the furnace material. During processing, the reaction mixture conglomerates and forms rings which render a proper operation of the kiln impossible. The conditions become still more difficult when aqueous alkali metal hydroxide solutions are used for the calcination. Starting materials comprising alkali metal hydroxide solutions as they are obtained, for instance, in the alkali electrolysis, phosphate rock and sand are in a liquid to muddy or at best pasty state. When such mixtures are directly introduced in a rotary kiln, they stick to the walls like a concrete layer which grows until it clogs completely the kiln.

It is a principal object of the invention to provide a process for the calcination of phosphate with an aqueous alkali metal hydroxide solution and silica which avoids the difficulties recited above.

Other objects and advantages will be apparent from a consideration of the specification and claims. The present invention is a process for the production of a calcined phosphate fertilizer in a rotary kiln comprising carbonating and concentrating in a first step an aqueous alkali metal hydroxide solution containing 30 to 80 percent by weight of alkali metal hydroxide by treatment with the $CO_2$ containing hot waste gases from the rotary kiln before or after the solution is mixed with a raw phosphate and silica, wherein the molar ratio of the alkali metal oxide $Me_2O$ introduced in form of an aqueous alkali metal hydroxide solution to the $P_2O_5$ of the raw phosphate is 1.2 : 1 to 1.5 : 1 and the molar ratio of $P_2O_5 : SiO_2$ is 1 : 0.1 to 1 : 0.9, the resulting mixture being worked up into a dry agglomerated product, and in a second step calcining in a flame heated rotary kiln at a temperature of 1,000° to 1,200° C, and employing the hot waste gases of said calcination for the first step.

In one embodiment of the present process, a mixture composed of phosphate rock, silica and alkali metal hydroxide solution is converted by treatment with the waste gases into a product, which can be calcined in the rotary kiln at high temperatures, without giving rise to the disturbances described above. An advantage of the process is, that the alkali metal component of the mixture, being in the form of an alkali metal hydroxide solution, e.g., of the kind obtained in alkali metal chloride electrolysis, can be employed in the starting mixture.

It has been found, that in most cases a preliminary further concentration of the alkali metal hydroxide solution can be dispensed with. Solutions of 40 to 70 weight % concentration can be very successfully used in most cases. Moreover, solutions with concentrations down to 30 weight % alkali metal hydroxide or lower can also be used, provided that intensive treatment with the hot waste gases is effected so as to concentrate the solutions. However, the energy requirements may make the use of solutions with concentrations below 30 weight percent alkali metal hydroxide uneconomic. Alkali metal hydroxide solutions with concentrations up to 80 weight percent can be used where the action of the waste furnace gases is intended to be of short duration. Suitable alkali metal hydroxide solutions are sodium and potassium hydroxide solutions and their mixtures.

Another advantage is that the carbon dioxide liberated during the calcining process and the heat of the waste gases leaving the kiln can be put to good use. It is also an advantage that the alkali metal compounds not converted in the kiln are absorbed by the alkali metal hydroxide solutions, thus avoiding large losses, especially in the case of the very volatile potassium hydroxide. At the same time, separation of the dust particles and absorption of harmful combustion gases take place, so that in some cases an additional mechanical or other purification of the waste gases can be dispensed with. Furthermore, the separated components exert a beneficial effect with regard to the consistency of the products to be fed to the calcining process.

The invention consists in a two-step process. In the first step, products suitable for the calcination are prepared by treating an alkali metal hydroxide solution, phosphate rock, and the required amount of silica with the exhaust gases from the calcining kiln. The product of the first step is then calcined to phosphate fertilizer in a second step.

To obtain the product of the first step, an aqueous alkali metal hydroxide solution is, prior to admixture of phosphate rock and the required amount of silica, treated with the carbon dioxide containing waste gases of the calcination process, which have a temperature of about 400° to 600° C. In this treatment, the heat of reaction and the waste heat carried by the oven gases, assists in the concentration of the formed alkali metal carbonate solution, and carbonation and concentration are continued until the solution has a concentration of 65 to 75 per cent by weight of the alkali metal carbonate. At such concentrations, the saturation limit of the hot solutions is normally exceeded and part of the alkali metal carbonate precipitates in form of small crystallites; in this case, the end product is a suspension.

The concentration of the starting alkali metal hydroxide solution is not critical. When the alkali metal hydroxide concentration is between 30 and 60, preferably between 45 and 55 per cent by weight, the desired alkali metal carbonate end concentration of 65 and 75 is generally obtained without additional heat supply. Alkali metal hydroxide solutions, as are obtained in the alkali metal chloride electrolysis, can be directly used.

The described treatment of the alkali metal hydroxide solutions has the further advantage of absorbing the escaped alkali metal compounds of the following calcination step, and generally the dust particles of the waste gases; this effect may be sufficient to obviate the need for a purification of the waste gases.

The obtained still hot high concentrated aqueous alkali metal carbonate solutions are, without being cooled, intimately mixed with the raw phosphate and the required amount of silica (sand), whereby granulation takes place. Said granulation can be assisted by passing over the mixture hot carbon dioxide containing gases. The granulation ensures a uniform heating of the charge in the kiln. The granulating property of the mixture depends on the concentration of the aqueous alkali metal carbonate suspension. If the concentration of the alkali metal carbonate solution or suspension is too low, only a pasty mixture is obtained which forms in the kiln large lumps which may interfere with the proper kiln operation and with the complete decomposition of the phosphate. As stated hereinabove, good granulates are obtained when alkali metal carbonate suspensions are used which contain about 65 to 75 per cent by weight of the carbonate. A small proportion of alkali metal hydroxide in the aqueous alkali metal carbonate suspension is not harmful for the subsequent kiln operation. This modification is of particular advantage when potassium hydroxide is employed.

If higher concentrated alkali metal hydroxide solutions are used as starting materials, e.g., those containing more than 60 per cent by weight of the hydroxide, suitable granulates are obtained also when the concentrated solutions are granulated by admixture of the raw phosphate and silica and when said granulate is then treated with the $CO_2$ containing waste gases of the calcination process. This embodiment of the invention is particularly recommended when sodium hydroxide is used. Granulation of the mixture takes place only when the alkali metal hydroxide content of the solutions is in the range of 60 to 80, preferably 65 to 75 per cent by weight. Soft, e.g., certain North African raw phosphates can be granulated already with 60 per cent by weight alkali metal hydroxide solutions while crystallized apatites require higher concentrated solutions.

The subsequent treatment with the carbon dioxide containing calcination waste gases is of great importance. If such separate treatment is omitted, the glossy granulated mixture remains soft and starts, immediately after it has been charged into the kiln, to aggregrate and to stick to the walls of the kiln. By the reaction with the carbon dioxide, which may be carried out in the mixing device used for the granulation, the grains harden to such an extent that they can be readily handled and charged into the kiln. The length of treatment with the gas depends on how strongly the outer layer of the grains should be hardened. With increasing length of treatment, the hard shell of the grains grows so as to increase continuously the total hardness of the grains. Depending on the mechanical stresses to which the grains will be subjected during the whole fabrication, the reaction time may extend from a few minutes to 1 hour. Of course, the ratio of the carbon dioxide to the granulated mixture introduced per unit of time has also to be taken into account. Also the size of the grains and the intensity of mixing during the treatment are factors influencing the reaction time. The carbon dioxide containing gases need not be used at elevated temperatures but may also be passed at normal temperature over or into the mixture. The obtained grains or pellets are externally dry and can be stored in bins without the risk of caking.

Granulated products well suitable for calcination are also obtained when aqueous solutions containing 40 to 60, preferably 45 to 55 per cent by weight of alkali metal hydroxide are mixed with raw phosphate and the required amount of silica and when such liquid to pasty mixtures are carbonated in a spray drier by means of the waste gases from the kiln calcination, and dried. In the hot atmosphere of the spray drier, substantially the entire water of the mixture is vaporized, and, what is particularly important, the alkali metal hydroxide is converted to alkali metal carbonate. In this way, the starting mixture is obtained in an easily manipulated form; this effect is due primarily to the fact that, in addition to the carbonation of the alkali metal hydroxide, the dust particles are taken up which had passed from the kiln into the spray drier. Said dust particles exert a reinforcing effect on the mixture. As a result, the bulk density of the obtained product, which is composed of fine to coarse particles, is unusually high. Generally, spray drying produces bulk densities below 0.5 kg/liter. In the process here described, bulk densities in the order of magnitude of 0.8 kg/liter are obtained. In this embodiment of the invention, alkali metal hydroxide concentrations above 60 per cent are not recommended because an excessive consistency of the starting mixture would render its feed into the spray drier difficult.

In accordance with another embodiment of the invention, produces suitable for calcination are obtained when aqueous solutions containing 40 to 70 per cent by weight of alkali metal hydroxide are mixed with raw phosphate and the required amount of silica to liquid to muddy products which are placed as thin layers of about 5 to 25 mm thickness on a support of inert material and dried with the hot oven gases at temperatures of about 150° to 250° C. A precondition for this procedure is that said support does not react with the components of the mixture at the drying temperature. Disregarding the possibility that the end product might become contaminated, such reaction would also interfere with the ready removal of the dried product.

Suitable materials for said supports are particularly polytetrafluoroethylene, nickel, or special steels. The support may be in the form of flat boxes or sheets. Generally, moving plates or belts will be preferred. The mixtures are applied to the support in the form of drops or as wide layers. The drying operation itself can be carried out in a tunnel kiln or the like. The mixtures are advanced in countercurrent to the waste gases coming from the calcination. If an organic material is used as a support, said gases should have a temperature only of about 150° to 250° C. Also in this embodiment of the invention, the dust and $CO_2$ content of the calcination gases assist the solidification of the mixture.

It is important to maintain the layer in a thickness of about 5 to 25 mm. The drying operation is accompanied by a change in the starting mixture. Inside said mixture, there are formed fine bubbles which impart porosity to the solidifying mass. This effect is very important for the further processing because the material, through sintering, maintains in the kiln its outer form and does not stick to the walls of the kiln. Preferably, a layer thickness of 10 to 20 mm is maintained. As soon as the mass has dried, it is lifted from the support, or it is allowed to peel off at the reversal point of the belt. If the mixture to be dried is introduced in form of drops, the dried substance is obtained in form of flakes and can be fed as such into the kiln for calcination. If the mixture is fed in the form of a broad layer, plates are obtained which are readily broken up to smaller pieces and are processed in said form.

A calcined phosphate useful as fertilizer must contain the components in certain mole proportions; 1.2 to 1.5 moles of $Me_2O$ (alkali metal oxide) must be added per 1 mole of $P_2O_5$. The molar ratio of $P_2O_5$ : $SiO_2$ in the mixture must be in the range between 1 : 0.1 and 1 : 0.9, preferably between 1 : 0.6 and 1 : 0.8. The $SiO_2$ amount in the mixture must be so adjusted that it binds the amount of CaO, which exceeds the molar ratio of 2 CaO : 1 $P_2O_5$, in form of $Ca_2SiO_4$. When the silica content of the raw phosphate does not satisfy said molar ratio, the required amount of $SiO_2$ is added as sand.

The calcination is carried out continuously in a rotary kiln which must be long enough to provide for a preheating zone and the calcination zone proper and in which the charge fed at one end is heated by the flame and combustion gases of a burner arranged at the discharge end and burning gas, coal dust or preferably oil. The flame gases heat the reaction mixture in the calcining zone to a maximum temperature in the range of 1,000° to 1,300°, preferably 1,050° to 1,200° C and are then passed in countercurrent to the charge which is preheated in a preheating zone of the kiln, and are used for the carbonation and granulation of the starting mixture as described hereinabove.

If potassium hydroxide has been used to prepare the mixture to be calcined, the calcination temperature is adjusted at 1,050° to 1,150° C; the preferred maximum temperature in this case is 1,130° C. If sodium hydroxide has been used, the preferred temperature range is 1,100° to 1,200° C. The total residence time of the charge in the kiln is about 1 to 1.5 hours, and the calcination proper requires about 15 minutes. The calcined product is then cooled and, if desired, ground.

A flow sheet showing diagrammatically the various steps of our process is attached hereto.

The calcined phosphates thus obtained are valuable fertilizers. The potash-phosphate products have the very high total plant nutrient content of 50 per cent of $P_2O_5$ and $K_2O$. As, in addition, the calcium is present in basic form, the fertilizers are particularly effective for lime-deficient soils. The $P_2O_5$ is substantially completely available.

The alkali is only to a more or less small extent soluble in water. The properties of the compound potash-phosphate fertilizers prepared according to the invention are particularly favorable. The water-soluble $K_2O$ portion amounts to about 15 to 20 per cent of the total $K_2O$. Only with the uptake of $P_2O_5$ by the soil or the plants, the residual $K_2O$ is slowly dissolved; this results in an extended fertilizer effect of the potash, in contrast to the conventional potash fertilizers. The product of the invention is readily ground and can be transformed with little water to hard wear-resistant grains. By addition of potassium salts during granulation, the $K_2O$ content of the calcined phosphate fertilizer can be increased, as desired.

The following examples illustrate without limiting the invention.

EXAMPLE 1

83.2 kg of an aqueous suspension containing 50 per cent by weight of potassium hydroxide were treated with the waste gases of a calination process which was carried out simultaneously and in which a mixture of raw phosphate, potassium carbonate, and silica was calcined. This treatment was continued until an aqueous suspension had been obtained which contained 69.9 per cent by weight of $K_2CO_3$. Only a small proportion (6.2%) of potassium was still in the form of potassium hydroxide. The hot suspension which contained also the dust particles of the waste gases, was then throughly mixed with 100.00 kg of a North African phosphate rock, which contained 37.6% $P_2O_5$, 50.8% CaO, 3.8% F, and 2.1% Si, and 8 kg of sand (98% $SiO_2$). A finely divided granulate was obtained and charged into the rotary kiln whose exhaust gases had been used for carbonating and concentrating the potassium hydroxide. In the rotary kiln, the material was heated at a maximum temperature of 1,130° C. The total residence time in the kiln was 30 minutes, the residence time in the calcination zone about 15 minutes. The lightly sintered product was easily ground and contained 26.4% of $P_2O_5$ and 3.6% of $K_2O$. The $P_2O_5$ was 100% soluble in 2% citric acid solution. The solubility in ammonium citrate solution was 96% and in Petermann solution 98%. 18% of the $K_2O$ dissolved in water.

EXAMPLE 2

100 kg of a North African phosphate rock (37.4% $P_2O_5$, 50.8% CaO, 2.1% $SiO_2$) were mixed with sand (98% $SiO_2$). In continuous operation of the mixer and agitator, 42.4 kg of an aqueous sodium hydroxide solution, which had a temperature of 80° C and contained 70% by weight of NaOH. In this operation, grains of a size of 3 to 15 mm were formed which had a low mechanical strength.

Under continuing agitation in the open mixing vessel, carbon dioxide in form of waste gases of a calcination process was passed over the mixture, whereby the initially glossy surface of the grains became dull and assumed gradually a dry condition. At the same time, a distinct heat reaction was observed. After a treatment of 20 minutes, the supply of carbon dioxide was discontinued. The obtained grains were very hard and had a dry surface. The product was calcined up to 1,150° C. It contained 28.8% $P_2O_5$ with a solubility of 96.1 in Petermann solution.

EXAMPLE 3

1,000 kg of a North African raw phosphate (37.4% $P_2O_5$) were mixed with 829 kg of an aqueous potassium hydroxide solution (50% by weight of KOH) and 80 kg of sand, and the mixture was passed into a spray drier which was heated with the waste gases of the rotary kiln used for the calcination of the dried product. The muddy mixture was dried and, simultaneously, th potassium hydroxide was converted to potassium carbonate by the carbon dioxide contained in said gases. The dry product had a bulk density of 0,83 kg/liter which could be compacted by tapping to 1.2 kg/liter; it was transferred to the rotary kiln and heated therein up to a maximum temperature of 1,130° C. Caking or ring formation on the walls of the kiln during the calcination did not take place.

The cooled and comminuted product containg 26.4% of $P_2O_5$ and 23.7% of $K_2O$. The $P_2O_5$ was 100% soluble in 2% citric acid solution, 95.8% soluble in ammonium citrate solution, and 96.6% in Petermann solution.

EXAMPLE 4

1,000 kg of a North African raw phosphate (34.4% $P_2O_5$) were mixed with 80 kg of sand and 830 kg of an aqueous solution containing 50% by weight of potassium hydroxide. There was obtained a fluid suspension which could be readily transferred to a moving Teflon band in form of droplet having a diameter of 15 to 20 mm. The Teflon band passed continuously through a drying oven in which the mixture was heated to a temperature of 200° C by means of the waste gases coming from the calcination kiln. At the end of the drying oven, the band was returned over a guide roller to the charge end of the oven. The dried mixture fell off the band in form of chips which were internally porous and had a bulk weight of 0.5 kg/liter. These were continuously charged into a pilot plant rotary kiln which had a basic lining, and were calcined therein up to a maximum temperature of 1,120° C. After cooling in a cooling drum, the finished product was comminuted. It contained 26.4% of $P_2O_5$ and 24.1% of $K_2O$. The $P_2O_5$ solubility of the product was 98.9% in citric acid solution and 95.9% in Petermann solution.

EXAMPLE 5

A starting mixture as obtained according to Example 4 was deposited as a wide layer on a revolving band of a special steel. The band was passed through a drier heated with the exhaust gases of the calcination kiln. On heating to at most 200° C, the mass slowly solidified with swelling. When the band passed around the pulley, the mixture came off the support in form of plates. Due to their porous condition, said plates could be readily broken to small pieces. The bulk weight was 0.59 kg/liter. The dried broken mixture was then heated in a basically lined pilot plant size rotary kiln up to 1,130° C. No sticking or caking was observed. After cooling, the obtained calcined phosphate was readily crushed and ground. It contained 26.3% of $P_2O_5$ and 23.9% of $K_2O$. The $P_2O_5$ solubilities were 98% in citric acid and 96.1% in Petermann solution.

EXAMPLE 6

The same starting mixture was used in the preceding examples was placed on flat nickel sheets in form of a layer having a height of 15 mm. The sheets were introduced into a drier heated by the waste gases of the calcination kiln. At 200° C, the mixture was converted to a porous cake which readily came off the support and could be broken into small pieces substantially without dust development. the comminuted product was calcined as described in Example 5. The calcined product left the kiln with the same appearance as it had entered the kiln; it contained 26.4% of $P_2O_5$ and 23.8% of $K_2O$. The $P_2O_5$ solubilities were 99.1% in citric acid solution and 97.1% in Petermann solution. Own tests have shown that the process according to the invention is applicable to any natural calcium phosphate e. g. Florida pebble phosphate, Curscao phosphate.

What is claimed is:

1. A process for the production of a citrate soluble calcined phosphate fertilizer in a rotary kiln comprising carbonating and concentrating in a first step an aqueous alkali metal hydroxide solution containing 30 to 80 percent by weight of alkali metal hydroxide by treatment with the $CO_2$ containing hot waste gases from the rotary kiln before or after the solution is mixed with a raw phosphate and silica, wherein the molar ratio of the alkali metal oxide $Me_2O$ introduced in form of an aqueous alkali metal hydroxide solution to the $P_2O_5$ of the raw phosphate is 1.2 : 1 to 1.5 : 1, the molar ratio of $P_2O_5$ : $SiO_2$ is 1 : 0.1 to 1 : 0.9, and the amount of $SiO_2$ is adjusted to bind the amount of CaO which exceeds the molar ratio of 2 CaO : 1 $P_2O_5$ in the form of $Ca_2SiO_4$, the resulting mixture being in the form of a dry particulate product, and in a second step calcining the mixture in a flame heated rotary kiln at a temperature of 1,000° to 1,300° C. and employing the hot waste gases of said calcination for the first step, said gases containing alkali metal compounds and dust particles in addition to said $CO_2$.

2. The process as claimed in claim 1 wherein said aqueous alkali metal hydroxide solution contains sodium hydroxide, potassium hydroxide, or a mixture thereof.

3. A process as claimed in claim 1 wherein the molar ratio of $P_2O_5$ : $SiO_2$ is 1 : 0.6 to 1 : 0.8.

4. The process as claimed in claim 1 wherein the alkali metal hydroxide is sodium hydroxide and the maximum temperature in the calcination step is 1,100° to 1,200° C.

5. The process as claimed in claim 1 wherein the alkali metal hydroxide is potassium hydroxide and the maximum temperature in the calcination step is 1,050° to 1,150° C.

6. The process as claimed in claim 1 comprising the step of comminuting th calcined product and granulating the same with water or a potassium salt.

7. The process as claimed in claim 1 wherein an aqueous alkali metal hydroxide solution of 60 to 80 weight percent concentration is mixed and granulated with the raw phosphate and any required amount of silica, whereafter the resulting granules are treated with the $CO_2$ containing hot waste gases from the rotary kiln.

8. A process as claimed in claim 7 wherein the aqueous alkali metal hydroxide solution contains 65 to 75 weight percent of alkali metal hydroxide.

9. A process as claimed in claim 7 wherein the alkali metal hydroxide is sodium hydroxide.

10. A process as claimed in claim 1 wherein an aqueous alkali metal hydroxide solution of 40 to 60 weight percent concentration is mixed with the raw phosphate and any required amount of silica, whereafter the resulting liquid or pasty mixture is carbonated and dried in a spray drier with the $CO_2$ containing hot waste gases from the rotary kiln.

11. A process as claimed in claim 10 wherein the aqueous alkali metal hydroxide solution contains 45 to 55 weight percent of alkali metal hydroxide.

12. A process as claimed in claim 1 wherein a liquid or slurry-like mixture is prepared from an aqueous alkali metal hydroxide solution of 40 to 70 weight percent concentration, raw phosphate and any required quantity of silica, and wherein the mixture is deposited in thin layers measuring about 5 to 25 mm. in thickness on a support made of an inert material and dried thereon with the $CO_2$ containing hot waste gases at a temperature of 150° to 250° C.

13. A process as claimed in claim 12 wherein the starting mixture is deposited on the drying support in droplet form or as a continuous layer measuring 10 to 20 mm. in thickness.

14. A process as claimed in claim 12 wherein the drying is carried out on a belt moving countercurrent to the waste gases.

15. A process for the production of a citrate soluble calcined phosphate fertilizer in a rotary kiln comprising converting in a first step an aqueous solution containing about 30 to 60 weight percent of alkali metal hydroxide with the $CO_2$ containing hot waste gases of the second step to an aqueous suspension containing 65 to 75 weight percent of alkali metal carbonate, mixing and granulating said suspension with raw phosphate and silica to a product, wherein the molar ratio of the alkali metal oxide $Me_2O$ to the $P_2O_5$ of the raw phosphate is 1.2 : 1 to 1.5 : 1, the molar ratio of $P_2O_5 : SiO_2$ is 1 : 0.1 to 1 : 0.9, and the amount of $SiO_2$ is adjusted to bind the amount of CaO which exceeds the molar ratio of 2 CaO : 1 $P_2O_5$ in the form of $Ca_2SiO_4$, calcining the granulated mixture in a second step in a flame heated rotary kiln at a temperature of 1,000° to 1,300° C. and employing the $CO_2$ containing hot waste gases of said calcination for the first step, said gases containing alkali metal compounds and dust particles in addition to said $CO_2$.

16. The process as claimed in claim 15 wherein the mixing and granulating of said suspension with raw phosphate and silica is carried out in the presence of said waste gases of the second step.

17. The process as claimed in claim 15 wherein said aqueous alkali metal hydroxide contains potassium hydroxide.

18. The process as claimed in claim 15 wherein said aqueous solution contains 45 to 55 percent by weight of alkali metal hydroxide.

19. The process as claimed in claim 15 wherein the alkali metal hydroxide is potassium hydroxide and the maximum temperature in the calcination step is 1,050° to 1,150° C.

* * * * *